(12) United States Patent
Lu et al.

(10) Patent No.: US 10,315,481 B2
(45) Date of Patent: Jun. 11, 2019

(54) SYSTEMS AND METHODS FOR VEHICLE DYNAMICS ASSIGNMENT

(71) Applicant: FORD GLOBAL TECHNOLOGIES, LLC, Dearborn, MI (US)

(72) Inventors: Jianbo Lu, Northville, MI (US); Davor David Hrovat, Ann Arbor, MI (US); Eric Hongtei Tseng, Canton, MI (US); Li Xu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/933,486

(22) Filed: Nov. 5, 2015

(65) Prior Publication Data
US 2017/0129298 A1    May 11, 2017

(51) Int. Cl.
*B60G 17/015*    (2006.01)

(52) U.S. Cl.
CPC ........ *B60G 17/015* (2013.01); *B60G 2400/10* (2013.01); *B60G 2400/204* (2013.01); *B60G 2400/25* (2013.01); *B60G 2400/32* (2013.01); *B60G 2400/39* (2013.01); *B60G 2400/41* (2013.01); *B60G 2400/52* (2013.01); *B60G 2400/80* (2013.01); *B60G 2400/841* (2013.01); *B60G 2400/843* (2013.01); *B60G 2500/30* (2013.01); *B60G 2800/914* (2013.01); *B60G 2800/9122* (2013.01)

(58) Field of Classification Search
CPC .......... B60G 17/015; B60G 2800/9122; B60G 2400/10; B60G 2400/25; B60G 2400/32; B60G 2400/41; B60G 2500/30; B60G 2800/914

USPC ...... 701/37–38; 280/6.157, 5.514, 5.515, 5.5
See application file for complete search history.

(56) References Cited

U.S. PATENT DOCUMENTS

| | | | |
|---|---|---|---|
| 4,634,142 A * | 1/1987 | Woods | B60G 17/0155 188/282.2 |
| 5,165,838 A * | 11/1992 | Kallansrude | B60G 17/0152 198/782 |
| 5,390,121 A | 2/1995 | Wolfe | |
| 5,452,919 A * | 9/1995 | Hoyle | B60G 17/0155 280/5.505 |
| 5,601,307 A * | 2/1997 | Heyring | B60G 17/015 280/6.157 |
| 5,632,503 A | 5/1997 | Raad et al. | |

(Continued)

OTHER PUBLICATIONS

An active suspension system for lunar crew mobility; Bill Bluethmann; Ed Herrera; Aaron Hulse; Josh Figuered; Lucien Junkin; Mason Markee; Robert O. Ambrose; 2010 IEEE Aerospace Conference; Year: 2010; pp. 1-9, DOI: 10.1109/AERO.2010.5446895.*

(Continued)

*Primary Examiner* — Cuong H Nguyen
(74) *Attorney, Agent, or Firm* — Jones Robb, PLLC; Raymond Coppiellie

(57) ABSTRACT

Systems and method for assigning vehicle suspension dynamics are disclosed. Control signals that correspond to a current driving dynamic of a suspension system of a vehicle are generated. A vehicle state associated with the generated control signals is computed and a non-traditional suspension mode is selected. Based on the computed vehicle state and the selected suspension mode, a suspension height of the vehicle is adjusted.

23 Claims, 3 Drawing Sheets

(56) References Cited

U.S. PATENT DOCUMENTS

| | | | |
|---|---|---|---|
| 6,418,363 B2* | 7/2002 | Cochofel | B60G 17/0185 280/5.513 |
| 6,470,248 B2* | 10/2002 | Shank | B60G 17/0185 280/6.157 |
| 8,065,054 B2 | 11/2011 | Tarasinski et al. | |
| 8,380,394 B1 | 2/2013 | Snodgrass | |
| 8,781,681 B2 | 6/2014 | Parison, Jr. et al. | |
| 8,840,118 B1* | 9/2014 | Giovanardi | F15B 13/0444 280/124.157 |
| 9,027,937 B2* | 5/2015 | Ryan | B60G 17/016 280/5.519 |
| 9,702,349 B2* | 7/2017 | Anderson | B60G 17/019 |
| 10,040,330 B2* | 8/2018 | Anderson | B60G 17/019 |
| 2006/0074530 A1* | 4/2006 | Meyers | B60G 17/016 701/1 |
| 2006/0142916 A1* | 6/2006 | Onuma | B60G 17/015 701/38 |
| 2007/0192002 A1* | 8/2007 | Iyoda | B60G 17/0164 701/37 |
| 2008/0119994 A1* | 5/2008 | Kameyama | B60W 40/08 701/48 |
| 2008/0183353 A1* | 7/2008 | Post | B60G 17/0165 701/42 |
| 2010/0152970 A1* | 6/2010 | Onuma | B60G 17/015 701/38 |
| 2011/0307147 A1* | 12/2011 | Bujak | B60G 17/0165 701/37 |
| 2013/0328277 A1* | 12/2013 | Ryan | B60G 17/016 280/5.519 |
| 2014/0371976 A1* | 12/2014 | Gilling | G01F 23/0061 701/29.1 |
| 2014/0371985 A1* | 12/2014 | Tseng | B60G 17/015 701/38 |
| 2014/0371986 A1* | 12/2014 | Hrovat | B60W 10/06 701/38 |
| 2015/0046032 A1* | 2/2015 | Clarke | B60G 17/0165 701/37 |
| 2015/0057885 A1 | 2/2015 | Brady et al. | |
| 2015/0224845 A1* | 8/2015 | Anderson | B60G 17/019 701/37 |
| 2015/0273970 A1* | 10/2015 | Ishikawa | B60G 17/0152 701/37 |
| 2016/0205482 A1* | 7/2016 | Raether | H04R 25/353 381/314 |
| 2017/0137023 A1* | 5/2017 | Anderson | B60G 17/0195 |
| 2017/0182859 A1* | 6/2017 | Anderson | B60G 17/019 |
| 2017/0217525 A1* | 8/2017 | Gahlert | B62M 6/45 |
| 2018/0134106 A9* | 5/2018 | Anderson | B60G 17/019 |
| 2019/0001782 A1* | 1/2019 | Anderson | B60G 17/019 |

OTHER PUBLICATIONS

Development of an electronic control system for active suspension; T. Aburaya; M. Kawanishi; H. Kondo; T. Hamada; 29th IEEE Conference on Decision and Control; Year: 1990; pp. 2220-2225 vol. 4, DOI: 10.1109/CDC.1990.204020.*

Adaptive vehicle parameter identification in speed varying situations; Mehmet Akar; Ali Dinçer Dere; 2011 14th International IEEE Conference on Intelligent Transportation Systems (ITSC); Year: 2011; pp. 1440-1445, DOI: 10.1109/ITSC.2011.6082926.*

Toyota electronic modulated air suspension system for the 1986 Soarer; M. Hirose; S. Matsushige; S. Buma; K. Kamiya IEEE Transactions on Industrial Electronics; Year: 1988, vol. 35, Issue: 2; pp. 193-200, DOI: 10.1109/41.192649.*

Design and Vehicle Implementation of Preview Active Suspension Controllers; Christoph Gohrle et al.; IEEE Transactions on Control Systems Technology; vol. 22, issue 3; IEEE Journals & Magazines; year 2014.*

Crone Body Control under Driver Inputs through Heave Velocity Regulation; Jean-Louis Bouvin et al.; 2017 IEEE Vehicle Power and Propulsion Conference (VPPC); pp. 1-5; IEEE Conferences; year 2017.*

Active suspension controller using MPC based on a full-car model with preview information; Christoph Göhrle et al.; 2012 American Control Conference (ACC); pp. 497-502; IEEE Conferences; year 2012.*

Model Predictive Control of semi-active and active suspension systems with available road preview; Christoph Göhrle et al.; 2013 European Control Conference (ECC); pp. 1499-1504; year 2013.*

* cited by examiner

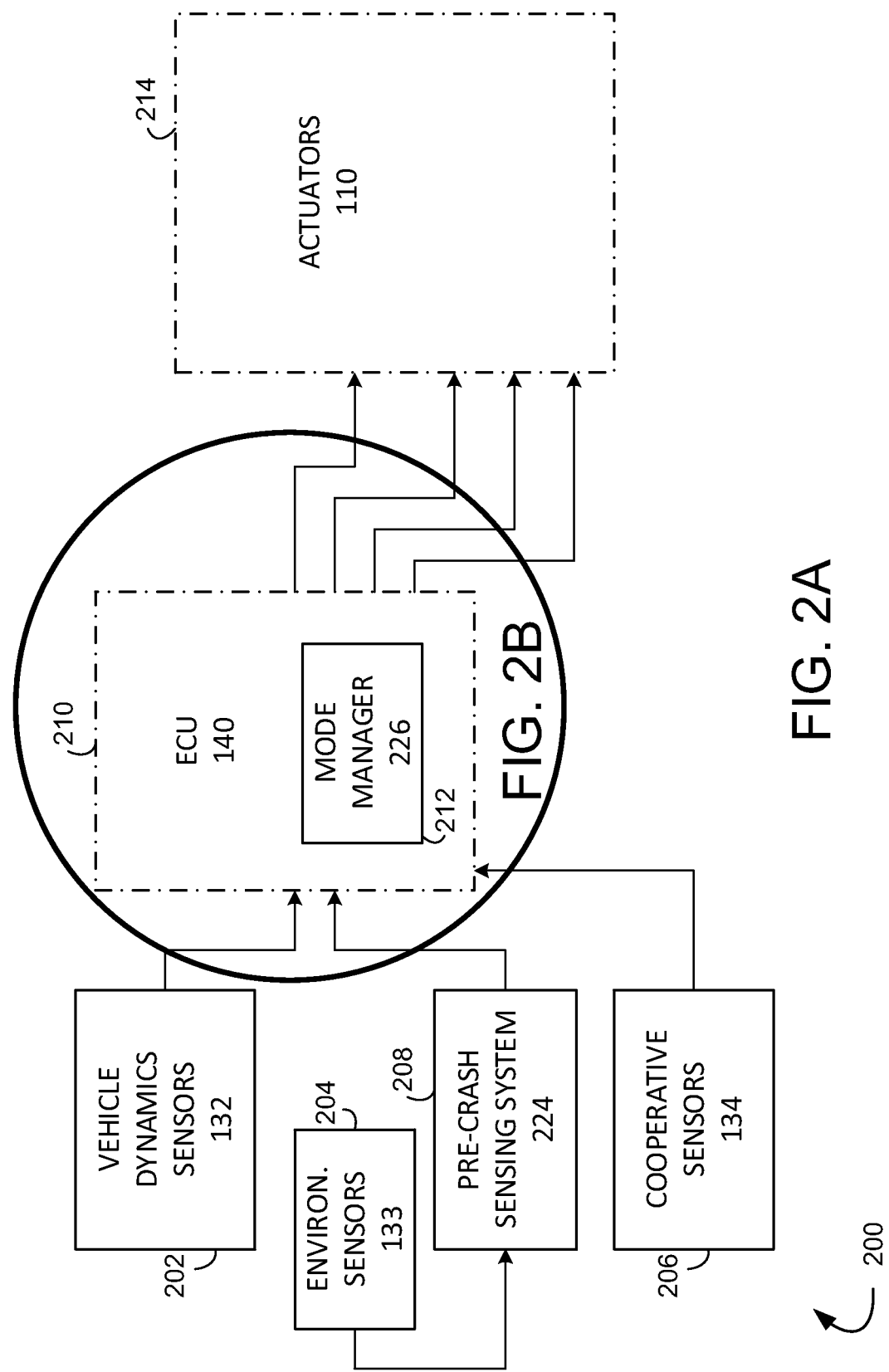

SYSTEMS AND METHODS FOR VEHICLE DYNAMICS ASSIGNMENT

TECHNICAL FIELD

The present application relates generally to controllable suspension systems, and more specifically, to an intelligent suspension system capable of integrating freeform vehicle dynamics assignment (FVDA) with existing capabilities of a full active suspension (FAS) system for achievement of traditional and non-traditional vehicle performance needs.

BACKGROUND

A vehicle's suspension system is responsible for drive comfort and safety of vehicle occupants as the suspension carries the vehicle-body over road disturbances, and transmits all forces between the vehicle-body and road surface. To positively influence drive comfort and safety, variable dampers and/or spring elements may be added to a vehicle's suspension system to enable adaptation to various driving conditions and considerably improve the drive comfort and safety of the vehicle compared to those having suspension systems with fixed properties.

Vehicles typically have one of two types of suspension systems: solid axle suspension and/or independent suspension. In the solid axle suspension systems, opposing wheels of the vehicle are mechanically linked with a solid connection, for example, a shaft or beam. Solid axle suspension dampers and links may connect the solid shaft to a chassis of the vehicle, which limits an ability of the vehicle's suspension to deliver flexible dynamics in response to an encountered road disturbance and/or changing terrain. Because solid axle suspension systems have limitations in respect of completely controlling vehicle dynamic assignment, for example, due to the fixed architecture limits, the transfer of road input to a vehicle-body operated at a low speed over rough road condition or at a high speed is perceived by a vehicle occupant as a harsh ride. In addition, solid axle suspension systems are often heavy, transfer forces from one vehicle wheel to another, and have difficulty with lateral control. This results in a suspension that is difficult to move and, once it is moving, often very hard to stop. Consequently, articulation, directional stability, unsprung mass vibrations, and towing performance of the vehicle may be limited. Because of this, solid axle suspension systems must balance and compromise between desired drive comfort and vehicle handling.

Independent suspension systems may individually connect each wheel to the chassis of the vehicle with a corresponding hydraulic damper and/or force actuator and link. A spring element can be added to the vehicle's suspension to reduce stress on the hydraulic damper such that oscillations of at least a portion of the vehicle that is spring suspended are damped. The vehicle's force actuator via the hydraulic damper and/or spring is capable of adding and dissipating energy independent of relative displacement or velocity across the vehicle's suspension. Because of this, selective adjustment of the damping and/or stiffness characteristics of the vehicle in response to contact between the vehicle's wheels and the road surface is enabled. In some instances, the vehicle's force actuator may use controllable elements to implement force feedback such that forces that are linear combinations of measured vehicle state variables are generated. These forces may be used to relax the constraints of the vehicle's suspension system and to enhance the vehicle's stability and articulation. In this manner, the vehicle's drive comfort and handling can be simultaneously improved.

When a vehicle is driven over road disturbances or on changing terrain, it may be desirable for a vehicle driver to assign vehicle suspension dynamics via various suspension modes (e.g., on-road, off-road, rock-crawling) that are reactive or adaptive to drive comfort and/or handling of the vehicle through switchable hardware. These dual mode suspension systems are designed to have a dual mode suspension architecture that can switch between, for example, a solid axle suspension architecture and an independent suspension architecture to overcome the drawbacks of the solid axle suspension system. For example, selective adjustment of the vehicle's suspension mode based on detected road disturbances and/or changing terrain can be enabled such that a vehicle driver can switch from a solid axle suspension mode to an active suspension mode in a similar manner as switching from, for example, four wheel drive to two wheel drive. This is often considered a vehicle's first intent to assign a vehicle's dynamics through switchable hardware. Alternatively, the dual mode suspension system may be designed to switch on or off an anti-roll bar of a vehicle such that the vehicle's off-road capabilities are enhanced without sacrificing on-road vehicle safety performance.

Due to increased levels of vehicle automation, integration of a high level of vehicle intelligence to deliver vehicle dynamics that are independent from traditional vehicle operating needs (e.g., drive comfort and/or handling as described above) to achieve non-traditional vehicle performance needs is desirable.

SUMMARY

In accordance with various exemplary embodiments, systems and methods for assigning vehicle suspension dynamics are described. In accordance with one aspect of the present disclosure, a method of assigning vehicle suspension dynamics includes generating control signals that correspond to a current driving dynamic of a suspension system of a vehicle. A vehicle state associated with the generated control signals is computed and a non-traditional suspension mode is selected. Based on the computed vehicle state and the selected suspension mode, a suspension height of the vehicle is adjusted.

In accordance with another aspect of the present disclosure, a system for assigning vehicle suspension dynamics is disclosed. The system comprises a controller configured to generate control signals that correspond to a current driving dynamic of a suspension system of a vehicle and compute a vehicle state associated with the generated control signals. Based on the computed vehicle state and the selected suspension mode, the controller is configured to adjust a suspension height of the vehicle.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein:

FIG. 2A is an illustration of the vehicle dynamics assignment system illustrated in FIG. 1 and a method for implementing the routine illustrated in FIG. 2B, according to one or more exemplary embodiments of the disclosed subject matter;

Figure 1:
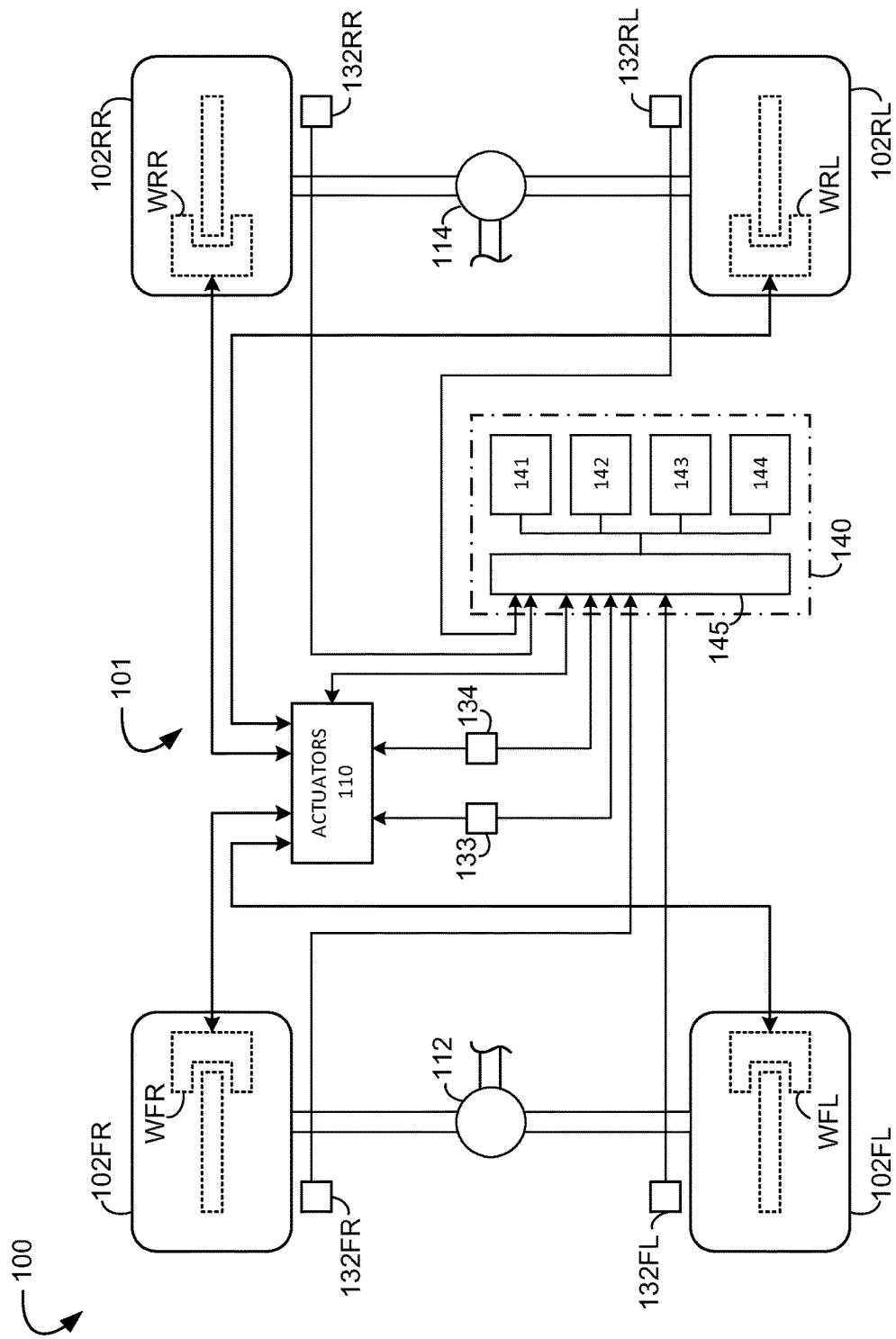
FIG. 1 is a schematic structural diagram of a vehicle having a vehicle dynamics assignment system in accordance with one or more exemplary embodiments of the disclosed subject matter.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a vehicle driver may desire an ultimate intelligent suspension system capable of achieving both traditional and non-traditional vehicle performance needs. Freeform Vehicle Dynamics Assignment (FVDA) delivers a vehicle dynamics and/or dynamical response independent of adaptations with respect to traditional vehicle operation needs (e.g., drive comfort and/or handling as described above) to achieve non-traditional vehicle performance needs.

In an exemplary embodiment, a vehicle on-board system collects real-time data and/or information about a current driving dynamic and may optically record information that relates to an encountered road disturbance, changing terrain, and/or road surface condition to achieve the vehicle's traditional performance needs. For non-traditional performance needs, the vehicle may implement FVDA and, based on generated control signals, select a desired suspension mode (e.g., anomaly mitigation suspension mode, entertainment suspension mode, mobility suspension mode, cooperative suspension mode, utility suspension mode, suspension minder mode, driver companion suspension mode, etc.). For example, the vehicle on-board system can use the generated control signals to dynamically assign suspension heights to an adaptive, semi-active, and/or active suspension system based on a selected suspension mode in response to both traditional and non-traditional inputs to render various desired vehicle dynamics.

Turning now to the drawings, FIG. 1 shows a schematic structural diagram of an exemplary vehicle 100 on which control system 101 is mounted. The control system 101 includes an electronic control unit (ECU) 140 (e.g., vehicle dynamics control module) in signal communication with actuators 110 that include: a drive force transmission actuator (not shown), which generates a drive force and transmits it to wheels 102 FR, 102 FL, 102 RR, and 102 RL; a brake control actuator (not shown) for generating braking force in each wheel 102 FR, 102 FL, 102 RR, and 102 RL by brake hydraulic pressure; a suspension system actuator (not shown); and, a steering control system actuator (not shown). The control system 101 further includes dynamic vehicle motion sensors such as 132 FR, 132 FL, 132 RR, and 132 RL; environmental sensors 133; and cooperative sensors 134.

The ECU 140 is a microcomputer which includes a Central Processing Unit (CPU) 141; Read-Only Memory (ROM) 142 in which are previously stored routines (programs) to be executed by the CPU 141, tables (look-up tables and stored maps), constants, and the like; Random-Access Memory (RAM) 143 in which the CPU 141 temporarily stores data as necessary; backup RAM 144 which stores data when the power supply is on and which maintains the stored data when the power supply is cut off; and an interface 145.

The ECU 140 can include storage elements such as a disk drive, flash, drive, memory circuit, or other memory device. The storage element can store software which can be used in operation of the ECU 140. Software can include computer programs, firmware, or some other form of machine-readable instructions, including an operating system, utilities, drivers, network interfaces, applications, and the like. The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices. Examples of the computer-readable recording medium include, but are not limited to, ROM, RAM, backup RAM, flash memory or other memory technology, holographic media or other optical disc storage, magnetic storage including magnetic tape and magnetic disk, and solid state storage devices.

The above components can be interconnected via a bus. The interface 145 can be configured to supply signals from the dynamic vehicle control sensors 132 FR, 132 FL, 132 RR, 132 RL, environmental sensors 133, cooperative sensors 134, and actuators 110 to the CPU 141. Further, in accordance with instructions from the CPU, the interface 145 outputs signals to, for example, solenoid valves (not shown) of the vehicle's suspension system, the actuators 110, and/or the vehicle operator.

A drive force transmission actuator (not shown) includes a drive force transmission that is configured to generate a drive force; a throttle actuator that includes a motor configured to control a throttle valve opening of an intake pipe of the vehicle engine; and, a fuel injector for transferring fuel to intake ports of the vehicle engine. The drive force transmission (not shown) further includes a transmission whose input shaft is connected to an output shaft of the engine; and, differentials 112, 114 that distribute and transmit the drive force from the engine to the front wheels 102 FR, 102 FL and rear wheels 102 RR, 102 RL.

A brake control actuator (not shown) includes a brake control module that comprises a brake hydraulic pressure generating portion that generates hydraulic pressure through, for example, control of boost activation to achieve boosted brake pressure, which corresponds to an operating force of a brake pedal at the front wheels 102 FR, 102 FL and rear wheels 102 RR, 102 RL of the vehicle 100. Brake hydraulic adjusting sections can also be provided at each of the front wheels 102 FR, 102 FL and rear wheels 102 RR, 102 RL, each of which can adjust the brake hydraulic pressure supplied to corresponding wheel cylinders WFR, WFL, WRR, WRL through either a pressure-reducing and/or pressure inducing valve. The hydraulic brake pressure within the wheel cylinders WFR, WFL, WRR, and WRL can be increased, maintained, and/or reduced through control of either valve.

A suspension system actuator (not shown) includes an adaptable, semi-active, active and/or dual suspension system that may include, for example, springs and/or shock absorbers configured to isolate a vehicle chassis (not shown) and occupants from sudden vertical displacements of the wheel assemblies 102 FR, 102 FL, 102 RR, and 102 RL during driving. The shock absorbers (not shown) help to dissipate the energy applied to the springs and damp oscillations that result when excitation is applied to the vehicle system.

In one embodiment, the vehicle's suspension system is an active suspension system configured to sense forces applied to the wheels 102 FR, 102 FL, 102 RR, 102 RL and to constantly adjust mechanical connections between the vehicle's chassis and wheel assemblies 102 FR, 102 FL, 102 RR, and 102 RL such that energy associated with a vertical motion of the wheels 102 FR, 102 FL, 102 RR, and 102 RL and suspension is absorbed. Various other aspects of suspension travel can be adjusted by a vehicle driver via ECU 140.

Alternatively, the vehicle's suspension system is a semi-active suspension or dual suspension system configured to adjust a flow of hydraulic fluid inside the shock absorber(s) via an electrically controlled valve to change the damping characteristics of the shock absorber(s). In an exemplary embodiment, an electrically generated magnetic field may be used to effectively change the viscosity of a shock absorber fluid that contains metallic particles.

In yet another embodiment, the vehicle's suspension system may be a fully active system configured to monitor forces imposed on the vehicle's suspension system and conditions of the road ahead. For example, sensors 132, 133, and 134 positioned on the vehicle 100 may be used to actively scan the road surface and/or changing terrain ahead to prepare the vehicle's suspension system ahead of time to compensate for sudden changes in road surface height or terrain.

A steering control system actuator (not shown) includes a steering control system with a motor control for electrically assisting or directly controlling steering of the vehicle 100. The steering control system can be, for example, an electronic power-assisted steering system (EPAS), an electric hydraulic power steering system (EHPS), or the like. The steering control system consists of a steering-assist motor on a steering column and a steering rack at the wheels 102 FR, 102 FL, 102 RR, and 102 RL of vehicle 100. A torque-sensing device may be mounted on the steering column. In one embodiment, digital signal processors or microcontrollers may be used for motor control of the steering control system. In addition, the steering control system may include sensor technologies for detecting steering wheel position, vehicle speed, torque, etc.

FIG. 2A is a schematic illustration of a Freeform Vehicle Dynamics Assignment System (FVDA) 200 and a method for implementing the same. Referring to FIGS. 1 and 2A, in an exemplary embodiment, the electronic control unit (ECU) 140 (e.g., vehicle dynamics control module) can be in signal communication with actuators 110. The ECU 140 is a microcomputer which includes a CPU 141; ROM 142 in which are previously stored routines (programs) to be executed by the CPU 141, tables (look-up tables and stored maps), constants, and the like; RAM 143 in which the CPU 141 temporarily stores data as necessary; backup RAM 144 which stores data when the power supply is on and which maintains the stored data when the power supply is cut off; and interface 145. The above components can be interconnected via a bus to a mode manager 226. The interface 145 can be configured to supply signals received from the dynamic vehicle control sensors 132, environmental sensors 133, cooperative sensors 134, and actuators 110 to the CPU 141 of the ECU 140 and to mode manager 226. Further, in accordance with instructions from the CPU and/or mode manager 226, the interface 145 selectively outputs signals to, for example, actuators 110 and/or the vehicle's operator. The mode manager 226 may also be a microcomputer which can include a CPU; ROM; RAM; and backup RAM.

In one embodiment, Freeform Vehicle Dynamics Assignment (FVDA) 200 is implemented via mode manager 226 of ECU 140 to deliver traditional and non-traditional vehicle dynamics and/or dynamical response. For example, mode manager 226 may be configured to implement a selected FVDA suspension mode, independent of adaptations with respect to traditional vehicle performance needs (e.g., drive comfort and/or handling as described above).

In an exemplary embodiment, at step 210, the ECU 140 and/or mode manager 226 may collect real-time data and/or information associated with a current driving dynamic from sensors 132, 133, and/or 134. Based on the collected real-time data and/or information, the ECU 140 and/or mode manager 226 computes an associated vehicle state and, based on the determined vehicle state, implements a control strategy and logic. The ECU 140 and/or mode manager 226 is configured to generate and transmit control signals to the actuators 110 based on a desired FVDA suspension mode.

For example, at step 202, as vehicle 100 travels over a uniform and/or smooth road surface, vehicle dynamics sensors 132 (e.g., rain sensors, road condition sensors, tire pressure sensors, height sensors, steering wheel sensors, longitudinal and lateral speed sensors, accelerator and brake pedal sensors, and inertial measurement units) collect and transmit data about the road surface to ECU 140 and/or mode manager 226. When a road surface change is detected, e.g., due to travel over road disturbances, changing terrain, changing surface condition, etc., the vehicle dynamics sensors 132 transmit control signals related to the road surface change to ECU 140 and/or mode manager 226. At steps 210 and 212, the CPU of ECU 140 and/or mode manager 226 create a look-up table based on the detected road surface change and may correlate the look-up table to an desired FVDA suspension mode, correction constant, and the like to be executed by the CPU. The look-up table can be generated by ECU 140 based on the transmitted control signals or can be accessed by the ECU 140 based on a previously stored table. In some instances, the look-up table can account for the correlation to a particular FVDA suspension mode, correction constant, and the like to be executed by the CPU of ECU 140. In accordance with instructions from the ECU 140 and/or mode manager 226, the interface 145 of the ECU outputs signals from, for example, the mode manager 226 to actuators 110 at steps 212 and 214.

In another exemplary embodiment, at step 204, environmental sensors 133 (e.g., radar sensors, LIDAR sensors, laser scans, vehicle cameras, Global Positioning System (GPS), navigation systems, and/or ultrasonic sensors, etc.) may be used by the ECU 140 and/or mode manager 226 to detect and map conditions of the road surface. For example, as the vehicle 100 travels over the road surface, environmental sensors 133 collect and transmit data about changes in the road surface to a pre-crash sensing system 224 at step 208. The pre-crash sensing system 224 may be configured to bundle received signals (e.g., multiple signals configured to robustly infer a potential crash condition) at step 208 and transmit the bundled signals to ECU 140 and/or mode manager 226 at step 210 for correlation to the look-up table described above. Mode manager 226 may use the look-up table to select a desired FVDA suspension mode, correction constants such as those conditioned based on tunable parameters, and the like to be executed by the CPU. In another embodiment, the bundled signals may be used by the ECU 140 and/or mode manager 226 to create topographic and/or geographic maps. For example, road characterizations from on-board sensor measurements are used in conjunction with available Global Positioning System (GPS) data to generate a driver history related map (e.g., routes previously driven prior to implementation of a digital map). These maps may be stored at the Read-Only Memory (ROM) or Random-Access Memory (RAM) of the ECU 140 and/or mode manager 226 for retrieval and selection of a desired FVDA suspension mode in the future. In accordance with instructions from the ECU 140 and/or mode manager 226, the interface 145 of the ECU outputs signals from, for example, the mode manager 226 to actuators 110 at steps 212 and 214.

At step 206, cooperative sensors 134 (e.g., vehicle-to-vehicle sensors, vehicle-to-infrastructure sensors, vehicle-to-cloud sensors, etc.) may be used by the ECU 140 and/or mode manager 226 to detect and store information about a companion vehicle, received topographic/road surface information based on information provided to a cloud/central server by other vehicles, received notice of a location of a pothole, and/or received traffic information based on information received at a central location from other vehicles, etc., at the Read-Only Memory (ROM or Random-Access Memory (RAM) of the ECU 140 and/or mode manager 226 for retrieval and selection of a desired FVDA suspension mode. In accordance with instructions from the ECU 140 and/or mode manager 226, the interface 145 of the ECU outputs signals from, for example, the mode manager 226 to actuators 110 at steps 212 and 214.

Figure 2B:
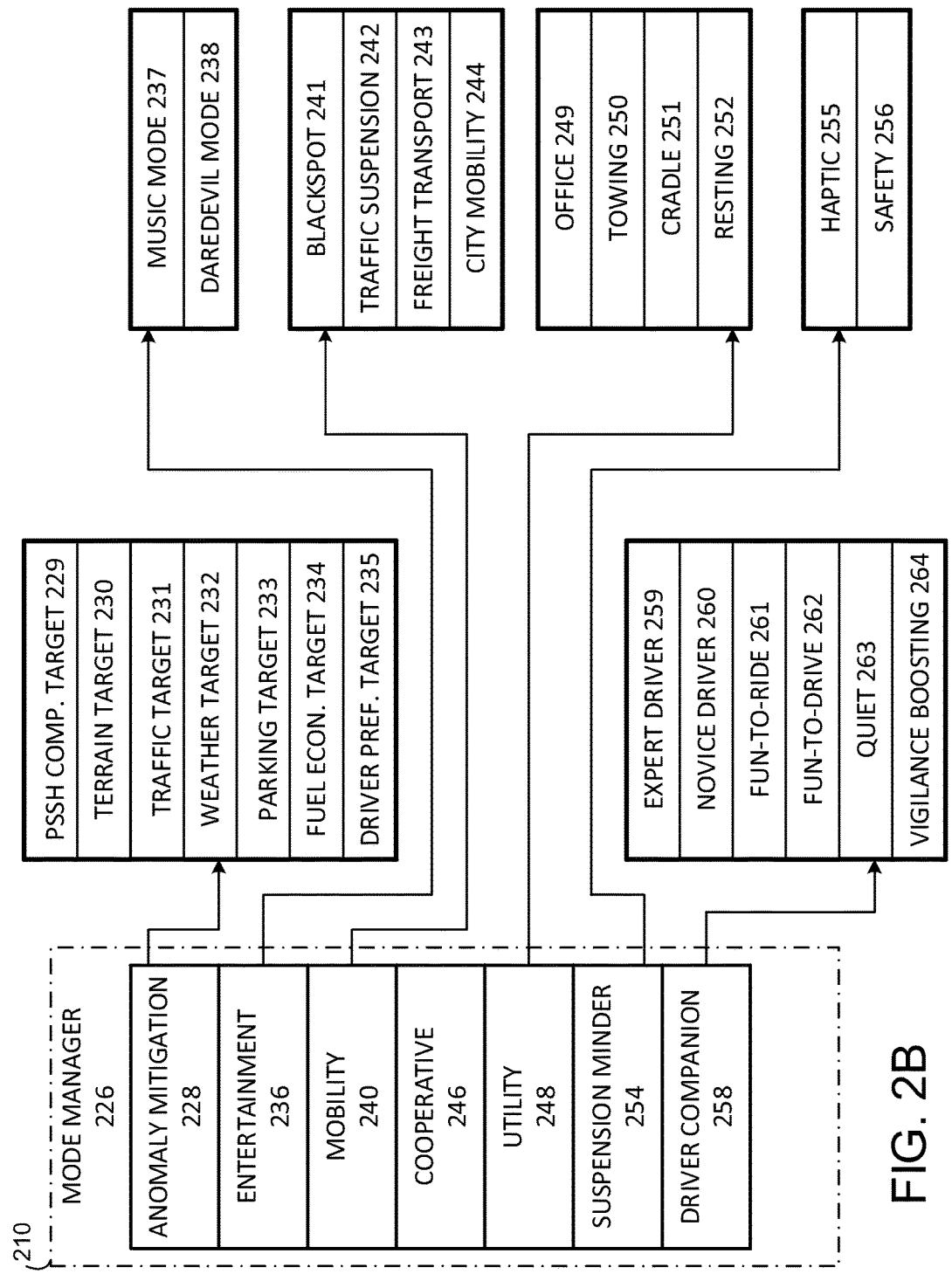
FIG. 2B is a simplified routine executed by a control module of the vehicle illustrated in FIG. 1, according to one or more exemplary embodiments of the disclosed subject matter.

Referring to FIG. 2B, in an exemplary embodiment, the ECU 140 and/or mode manager 226 may collect real-time data and/or information about a current driving dynamics via sensors 132, 133, and 134 and may record that data and/or information at the CPU of the ECU 140 and/or mode manager 226 at step 210. For non-traditional performance needs, the vehicle 100 may implement FVDA and, based on generated control signals from sensors 232, 233, and 234, select a desired suspension mode (e.g., anomaly mitigation suspension mode, entertainment suspension mode, mobility suspension mode, cooperative suspension mode, utility suspension mode, suspension minder mode, driver companion suspension mode, etc.).

Anomaly Mitigation Suspension Mode (AMSM)

For example, at step 210, vehicle 100 may implement an anomaly mitigation suspension mode 228 (AMSM) via ECU 140 and/or mode manager 226. Selection of AMSM 228 can be triggered by detected wear and/or deterioration of the vehicle's chassis sub-system that results in an uneven ride height at wheels 102 FR, 102 FL, 102 RR, and 102 RL of vehicle 100. AMSM may be configured to passively vary a ride height of the vehicle-body at the wheels 102 FR, 102 FL, 102 RR, and 102 RL (e.g., passive static suspension height (PSSH)) based on a level of detected sub-system wear and/or deterioration. For example, AMSM can be designed to regulate for a desired ride height such that a target ride height value is achieved.

In one embodiment, AMSM integrates an offset value to the desired ride height that is configured to compensate for the detected ride height unevenness resultant from the detected chassis sub-system wear and/or deterioration to achieve the target ride height value. For example, a suspension ride height $z_i$ for each of the vehicle wheels 102 FR, 102 FL, 102 RR, and 102 RL, e.g., $i \in \{1, 2, 3, 4\}$, can be decomposed into components:

$$z_i = z_{oi} + \Delta z_{smi} + \Delta z_{ai} + \Delta z_{di} \quad (1)$$

where $z_{oi}$ is a nominal static suspension height for $i \in \{1, 2, 3, 4\}$, $\Delta z_{smi}$ is the static suspension height due to sprung mass variation over the nominal weights, $\Delta z_{ai}$ is the static suspension height variation due to abnormal chassis condition, e.g., sagging and/or component wear, and $\Delta z_{di}$ is the dynamic suspension height variation due to vertical dynamics of the vehicle.

In AMSM, a suspension height sensor measurement for $i \in \{1, 2, 3, 4\}$ can be defined as:

$$z_{si} = z_i + \Delta z_{osi} + \Delta z_{ni} \quad (2)$$

where $z_{osi}$ is resultant of a sensor offset value and $\Delta z_{ni}$ is resultant of sensor noise such that a compensated suspension height measurement may be denoted as $z_{sci}$. Adjustment of the suspension and/or vehicle ride height can be conducted, for example, through ECU 140 and/or mode manager 226 based on a suspension height request signals via actuators 110 and/or dynamic vehicle control sensors 132 FR, 132 FL, 132 RR, and 132 RL located at the wheels 102 FR, 102 FL, 102 RR, and 102 RL, of the vehicle 100. A target suspension height $z_{tgti}$ may be determined for $i \in \{1, 2, 3, 4\}$. For example, a suspension height regulator can be used to generate a control signal that drives the $i \in \{1, 2, 3, 4\}$ of the controlled suspension system. In one instance, AMSM may implement a Proportional-integral-Derivative (PID) control scheme, the control input to the $i \in \{1, 2, 3, 4\}$ suspensions would be, for example:

$$u_i = k_{Pi}(z_{sci} - z_{tgti}) + k_{Ii}\int(z_{sci} - z_{tgti})dt + k_{Di}(\dot{z}_{sci} - \dot{z}_{tgti}) \quad (3)$$

where $k_{Pi}$, $k_{Ii}$, $k_{Di}$ are the tunable parameters called control gains. Other control algorithms may be used to regulate a suspension height of the vehicle in AMSM to achieve the target setting. For example, AMSM may implement a model based or adaptive control scheme to design a desired suspension height regulator. The determined static suspension heights may be further divided as set forth below:

$$z_{tgti} = \gamma_1 z_{pssh} + \gamma_2 z_{terrain} + \gamma_3 z_{bump} + \gamma_4 z_{traffic} + \gamma_5 z_{night} + \gamma_6 z_{weather} + \gamma_7 z_{parking} + \gamma_8 z_{fuel} + \gamma_9 z_{driver} \quad (4)$$

to determine, for example, a Passive Static Suspension Height (PSSH) compensation Target 229, a Terrain Target 230, Traffic Target 231, a Weather Target 232, a Parking Target 233, a Fuel Economy Target 234, and/or a Driver Preference Target 235. The aforementioned targets will be described in further detail below.

Passive Static Suspension Heights (PSSH) Compensation Target

PSSH variations may affect a desired range (e.g., an amount and direction of a change in angle between a vertical axis of the wheels 102 FR, 102 FL, 102 RR, and 102 RL of the vehicle 100 and the vertical axis of the vehicle 100 when viewed from a front or rear of the vehicle 100) of, for example, control arms of the vehicle's suspension system during a disturbance. In one embodiment, operation of the vehicle's suspension beyond a nominal range may result in an undesired variation in the desired range of the control arms of the vehicle's suspension system. Alternatively, variations in a static suspension height can upset a desired steering geometry of, for example, the front suspension system of the vehicle 100. For example, raising or lowering a rear end of the vehicle 100 may result in a change in the angle of the steering axis of the front suspension system affecting the vehicle's steering stability, effort, and return-ability. In a similar manner, variations in the vehicle's PSSH may result in bottoming out of the vehicle's suspension system and/or excessive vehicle-body motion during cornering, vehicle dive, towing performance, and/or torque steering.

In an exemplary embodiment, AMSM may be configured to passively vary a ride height of the vehicle-body at the wheels 102 FR, 102 FL, 102 RR, and 102 RL to compensate for PSSH based on a level of detected suspension wear and/or deterioration. For example, AMSM can be designed to regulate for a desired ride height through application of an offset value to mitigate PSSH variations. In accordance with instructions from the ECU 140 and/or mode manager 226, the interface 145 of the ECU outputs signals from, for example, the mode manager 226 to actuators 110 at steps 212 and 214 to implement AMSM and the determined offset value, the PSSH compensation target 229.

Terrain Target

In another exemplary embodiment, AMSM may be configured to compensate for a static suspension height of the vehicle 100. For example, AMSM may implement a terrain target suspension height value based on, for example, data and/or information about a current terrain type (e.g., off-road, potholes, flooding, etc.,) transmitted to ECU 140 and/or manager mode 226 via one or more of sensors 132, 133 and 134. The terrain target suspension value may be used to increase and/or decrease ground clearance over the detected current terrain type to meet a target terrain clearance value 230.

Traffic Target

In one exemplary embodiment, AMSM may be configured to compensate for a detected traffic condition of the vehicle. For example, AMSM may adjust a static suspension height of the vehicle 100 to achieve a maximum vehicle ride height based on a heavy traffic condition detected and reported by one or more of sensors 132, 133, and 134 to ECU 140 and/or mode manager 226 such that a vehicle operator's field of view is improved. Alternatively, ECU 140 and/or mode manager 226 may adjust a pitch and/or roll angle of the vehicle 100 to achieve a maximum desired ride height in the form of traffic compensation target 231 desired by AMSM.

Weather Target

In another exemplary embodiment, AMSM may be configured to compensate for a detected weather condition reported by one or more of sensors 132, 133, and 134 to ECU 140 and/or mode manager 226. For example, AMSM may adjust a static suspension height of the vehicle 100 based on a foggy and/or wet weather condition to achieve a nose-up and/or nose-down position of the vehicle such that a vehicle operator's visibility of the road surface is improved and the weather compensation target 232 desired by the AMSM is achieved.

Parking Target

In one exemplary embodiment, AMSM may be configured to compensate a suspension height of the vehicle 100 to achieve a parking compensation target 233. For example, AMSM may adjust a static suspension height of the vehicle to achieve a nose-up and/or nose-down position of the vehicle 100 such that a pitch angle desired by the AMSM is achieved. In this way, the driver's field of view is expanded in the vertical direction such that he can clearly see other surrounding vehicles so as to facilitate his parking, e.g., to reduce potential contact with surrounding vehicles.

Fuel Economy Target

In another exemplary embodiment, AMSM may be configured to dynamically adjust a suspension height of the vehicle to achieve a drag factor desired by the AMSM. For example, signals generated by sensors 132, 133, and 134 may be used by the ECU 140 and/or mode manager 226 to determine a drag factor associated with a current wind speed. When, for example, the drag factor indicates that the current wind speed is moving in a direction against the vehicle's direction of travel, e.g., a head wind, the AMSM may decrease the suspension height of the vehicle 100 to a minimum position and/or vehicle-body ride height value to achieve a maximum fuel economy target value 234. Alternatively, when, for example, the drag factor indicates that the current wind speed is moving in a same direction as the vehicle's direction of travel, e.g., a tail wind, the AMSM may increase the suspension height of the vehicle 100 to a maximum position and/or vehicle-body ride height value to achieve a maximum fuel economy target value 234. In addition, AMSM may dynamically adjust the vehicle's pitch and/or roll angle to achieve a sail-like effect.

Driver Preference Target

In one exemplary embodiment, AMSM may be configured to dynamically adjust a suspension height of the vehicle to achieve a minimum vehicle ride height. For example, during aggressive vehicle maneuvering, signals generated by sensors 132, 133, and/or 134 may be used by the ECU 140 and/or mode manager 226 to reduce a vehicle's center of gravity and/or maneuver induced roll and pitch motions by lowering a ride height of the vehicle 100. In some instances, AMSM configures the vehicle's suspension mode such that the vehicle's suspension height is regulated to align with, for example, high/low frequency targets and/or height targets to achieve a vehicle driver's height preference 235.

Entertainment Suspension Mode (ESM)

At step 210, vehicle 100 may implement an entertainment suspension mode 236 (ESM) via ECU 140 and/or mode manager 226. Selection of ESM 236 can be triggered by a vehicle driver's desire for non-traditional performance inputs, for example, entertaining. Based on the driver's non-traditional performance inputs, the vehicle 100 may implement FVDA and, based on generated signals from sensors 132, 133, and/or 134, select a desired entertainment mode (e.g., music mode 237 and/or daredevil mode 238).

Music Mode

In one exemplary embodiment, ESM 236 may be configured to dynamically adjust a suspension height of the vehicle to achieve a target suspension height computed as a function of characteristics of a music tone or beat that is desired by the vehicle driver (e.g., music mode 237). For example, ESM 236 may adjust the suspension height based on musical tones that include volume, pitch, and/or timbre/rhythm. In one embodiment, musical volume may correlate to an amplitude of a sound wave; musical pitch may correlate to a frequency of the sound wave (e.g., how high or low a musical tone is); and, timbre may correlate to a multitude of sine waves of the musical tone. In some instances, when, for example, musical tone is contaminated by sound noise, a Fast Fourier Transform (FFT) may be used to analyze the frequency content of the musical tone.

In another embodiment, the correlated amplitude and frequency of the sound wave of a musical tone may be stored at the CPU 141 of the ECU 140 and/or mode manager 226. The amplitude and frequency of the sound wave of a selected musical tone may be compressed, for example, from a large frequency range (e.g., a frequency range higher than a frequency range experienced by an occupant of a vehicle for drive comfort and/or handling, for example, approximately 0 to 40 Hertz) into the 0 to 40 Hertz range through a non-linear mapping. The amplitude of the selected musical tone may be regulated through targeted control of the vehicle's suspension height by, for example, inversing a coordinated vehicle heave, roll, and/or pitch vehicle-body motion matrix. But, the overall magnitude of the targeted vehicle suspension height range can follow the magnitude trend of the selected musical tone.

Daredevil Mode

In one exemplary embodiment, ESM 236 may be configured to regulate a suspension height of the vehicle to achieve a target suspension height that correlates to a desired daredevil driving experience (e.g., daredevil mode 238). For example, the vehicle's suspension height may be mapped to the target suspension height such that the vehicle 100 can be driven on, for example, two and/or three wheels without overturning to achieve the daredevil driving experience. The ESM 236 may be configured to coordinate small brake steering and/or throttling of the vehicle to a desired suspension height adjustment and, in some instances, implement a safety guard via actuators 110.

Mobility Suspension Mode (MSM)

At step 210, vehicle 100 may implement a mobility suspension mode 240 (MSM) via ECU 140 and/or mode manager 226. Selection of MSM 240 can be triggered by suspension mobility scenarios, for example, blackspot 241, traffic suspension 242, freight transport 243, and/or city mobility 244. MSM 240 can be designed to regulate the suspension mode of the vehicle to arrive at the various suspension mobility scenarios.

Avoidance Suspension Mode

In one embodiment, MSM 240 may be configured to dynamically adjust a suspension height of the vehicle 100 and/or a spring and damping rate to achieve a fast response timing. For example, MSM 240 may adjust the suspension height and/or spring and/or damping rate of the vehicle 100 based on signals generated by sensors 132, 133, and/or 134 that indicate the vehicle 100 is approaching an accident prone area (e.g., a avoidance area 241). The ECU 140 and/or mode manager 226 may alert a vehicle driver of the detected blackspot area 241 and use, for example, a wireless modem and/or navigation system to dynamically adjust the suspension height and/or spring and/or damping rate of the vehicle to compensate for the detected avoidance area 241.

Traffic Suspension Mode

In another exemplary embodiment, MSM 240 may be configured to compensate for drive comfort and/or vehicle performance based on a detected level of traffic congestion (e.g., traffic suspension mode 242). For example, when the vehicle 100 is moving through a congested high traffic area, sensors 132, 133, and/or 134 may collect data and/or information about the congested high traffic area and transmit the collected data and/or information to the ECU 140 and/or mode manager 226. The collected data and/or information may be correlated to a desired drive comfort and/or vehicle performance and the suspension dynamically adjusted by MSM 240 to facilitate driving.

Freight Transporting Suspension Mode

In another exemplary embodiment, MSM 240 may be configured to program the vehicle's suspension system to be insensitive to variation in loading that results from a change to static and/or dynamic loading of the vehicle 100 (e.g., freight transporting mode 243). For example, sensors 132, 133, and/or 134 may collect data and/or information that relates to a changed loading condition of the vehicle 100 and transmit the collected data and/or information to the ECU 140 and/or mode manager 226. Based on the collected data and/or information, the MSM 240 may calculate a variation in the static and/or dynamic loading of the vehicle 100. When the calculated variation exceeds a threshold, MSM's 240 freight transporting mode 243 is triggered.

City Mobility Mode (CSM)

In another exemplary embodiment MSM 240 may be configured to compensate an aggressive driving input function by integrating a parking mode and/or various other comfort modes such that the vehicle's suspension dynamics are limited (e.g., city mobility mode 244). For example, sensors 132, 133, and/or 134 may collect data and/or information that relates to vehicle surroundings and transmit the collected data and/or information to the ECU 140 and/or mode manager 226. Based on the collected data and/or information, MSM 240 may calculate a limiting factor and apply the limiting factor to an aggressive driving input function to limit the vehicle's suspension dynamics.

Cooperative Suspension Mode

At step 210, vehicle 100 may implement a cooperative suspension mode 246 (CSM) via ECU 140 and/or mode manager 226. Selection of CSM 246 may be triggered by, for example, a host vehicle. For example, ECU 140 and/or mode manager 226 can dynamically adjust a suspension height of vehicle 100 to be congruent with the suspension height of the target vehicle. These cooperative vehicle ride heights can be used, for example, to transfer goods from one vehicle to the other and/or to increase safety during vehicle-on-vehicle collisions.

Utility Suspension Mode (USM)

At step 210, vehicle 100 may implement a utility suspension mode 248 (USM) via ECU 140 and/or mode manager 226. Selection of USM 248 can be selected by vehicle occupants based, for example, on their desired use of the vehicle 100, for example, use as a traveling office (office mode 249), to use the vehicle to tow something such as a boat or other vehicle (towing mode 250), used to lull a crying infant to sleep (cradle mode 251), and/or used to rest (resting mode 252).

Office Suspension Mode

In one exemplary embodiment, USM 248 may be configured to coordinate with sub-systems of the vehicle 100 to assign vehicle dynamics that support and enhance, for example, a moving office space (e.g., office suspension mode 249). For example, the nature of the vehicle occupant's moving office space may be such that a quietness of the vehicle ride is weighted heavier than the vehicle handling requirements. In this situation, the ECU 140 and/or mode manager 226, based on signals received from sensors 132, 133, and/or 134, may generate signals to instruct a reduction in vehicle speed and/or may implement a constant vehicle speed mode.

Towing Suspension Mode

In another exemplary embodiment, USM 248 may be configured to compensate for load-induced ride height variations and/or for large dynamical attitude variations resultant from vehicle loading and/or motion (e.g., towing suspension mode 250 (TSM)). For example, ECU 140 and/or mode manager 226 can implement TSM 250 to meet a load insensitive setup requirement such that variations in payload does not influence the vehicle's suspension dynamics. Variations in payload may be detected by, for example, signals generated by sensors 132, 133, and/or 134 and transmitted to the ECU 140 and/or mode manager 226.

Cradle Suspension Mode

In one exemplary embodiment, USM 248 may be configured to assign a low-frequency movement to the vehicle-body based via the suspension system based on a detected infant/cradle movement (e.g., cradle suspension mode 251 (CSM)). For example, ECU 140 and/or mode manager 226 may implement a target sooth function, selected by a vehicle driver, which correlates to a detected cradle suspension frequency.

Resting Suspension Mode

In another exemplary embodiment, USM 248 may be configured to implement a target smooth ride function that correlates to, for example, a frequency of motion experienced in a moving train (e.g., resting suspension mode 252 (RSM 252)). In an autonomous vehicle, RSM 252 may be implemented for all vehicle occupants. In a non-autonomous vehicle, RSM 252 may implemented by vehicle occupants other than the vehicle driver if the driver seat can be individually controlled. For example, in a non-autonomous vehicle, ECU 140 and/or mode manager 226 may assist a vehicle driver via USM 248 to achieve a smooth resting mode. Alternatively, RSM 252 may be implemented when a vehicle is in a parked position.

Suspension Minder Mode (SMM)

At step 210, vehicle 100 may implement a suspension minder mode 254 (SMM) via ECU 140 and/or mode manager 226. Selection of SMM 254 can be triggered by, for example, a detected safety hazard and/or obstacle. For example, SMM 254 can be designed to regulate for haptic suspension 255 and/or safety suspension 256.

Haptic Suspension Mode

In one exemplary embodiment, SMM 254 may be configured to implement a haptic queue that induces vehicle body vibrations which can be felt by the driver and stored at, for example, ECU 140 and/or mode manager 226 based on a detected frequency signal and/or vibration of the vehicle-body (e.g., haptic suspension mode 255). For example, signals generated by sensors 132, 133, and/or 134 may be received at ECU 140 and/or mode manager 226 and correlated to a driving condition. When, for example, the signals indicate a haptic driving condition (e.g., vibrations that can be felt by vehicle occupants inside the vehicle), the ECU 140 and/or mode manager 226 may alert the vehicle driver to a change in the driving condition of the vehicle.

Safety Suspension Mode

In another exemplary embodiment, SMM 254 may be configured to map a current vehicle suspension height to a target vehicle suspension height to improve safety, stability, and/or ride of the vehicle (e.g., safety suspension mode 256). For example, signals generated by sensors 132, 133, and/or 134 may be used to determine a current operating mode of the vehicle 100. The current operating mode can be selected by the vehicle driver or automatically imposed. Based on the current operating mode, the ECU 140 and/or mode manager 226 may determine, based on a mapping to stored suspension heights, a factor to be applied to the current operating mode such that the vehicle's safety, stability, and/or ride is improved.

Driver Suspension Mode (DCSM)

At step 210, vehicle 100 may implement a driver companion suspension mode 258 (DCSM) via ECU 140 and/or mode manager 226. Selection of DCSM 258 can be triggered by a vehicle driver's behavior and/or emotional state and may include, for example, expert driver mode 259, novice driver mode 260, fun-to-ride mode 261, fun-to-drive mode 262, quiet mode 263, and/or vigilance boosting mode 264.

Expert Driver Suspension Mode

In one exemplary embodiment, DCSM 258 may be configured to dynamically adjust a suspension height of the vehicle to imitate, for example, a racing sensation (e.g., expert driver suspension mode 259 (EDSM)). For example, DCSM 258 may implement a fast response time and/or increased rate of actuation change via ECU 140 and/or mode manager 226 to mimic an aggressive driving action. Implementation of DCSM 258 may be enabled by, for example, signals generated by sensors 132, 133, and/or 134. In some instances, when safety is guaranteed, ECU 140 and/or mode manager 226 may control the vehicle suspension system such that the vehicle 100 is purposefully caused to drift.

Novice Driver Suspension Mode

In another exemplary embodiment, DCSM 258 may be configured to map a suspension height of the vehicle to a target suspension height for an inexperienced driver (e.g., novice driver suspension mode 260 (NDSM)). For example, ECU 140 and/or mode manager 226 may be configured to dynamically adjust a suspension height of the vehicle 100 such that driving smoothness is increased while driving aggressiveness is decreased.

Fun-to-Ride Suspension Mode

In one exemplary embodiment, DCSM 258 may be configured to dynamically adjust a suspension height of the vehicle to achieve a rough ride (e.g., fun-to-ride suspension mode 261 (FTRSM)). For example, ECU 140 and/or manager mode 226 via actuators 110 can adjust the suspension heights of the vehicle to achieve a rough ride that results in a fun-to-ride sensation for vehicle occupants.

Fun-to-Drive Suspension Mode

In another exemplary embodiment, DCSM 258 may be configured to dynamically adjust a suspension ride height of the vehicle to achieve a fun-to-drive sensation (e.g., fun-to-drive suspension mode 262 (FTDSM)). For example, ECU 140 and/or manager mode 226 via actuators 110 can adjust the vehicle's suspension heights to achieve a target suspension height such that the vehicle driver is capable of, for example, controlling race-car like maneuvers, drift, sharp turns, and/or fast negotiation.

Quiet Suspension Mode

In one exemplary embodiment, DCSM 258 may be configured to operate in tandem with, for example, active noise cancellation to reduce road-induced noise and/or detected vehicle vibrations (e.g., quiet suspension mode 263 (QSM)).

Vigilance Boosting Suspension Mode

In another exemplary embodiment, DCSM 258 may be configured to increase a vibration sensation experienced by a vehicle occupant via the vehicle-body when, for example, driver fatigue is detected (e.g., vigilance boosting suspension mode 264 (VBSM)). For example, ECU 140 and/or mode manager 226 may implement VBSM 264 to alert a vehicle driver and boost driver vigilance.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for assigning vehicle suspension dynamics:
    generating control signals corresponding to a current driving dynamic of a vehicle suspension system;
    computing a vehicle state associated with the generated control signals;
    when the computed vehicle state is indicative of an anomaly in a predetermined vehicle target, selecting an anomaly mitigation suspension mode, wherein the anomaly mitigation suspension mode is configured to control the vehicle suspension to achieve a desired suspension height for each of a plurality of predetermined vehicle targets, wherein the predetermined vehicle targets include chassis deterioration, a fuel economy target, a passive static suspension height (PSSH) compensation target, a terrain target, a traffic target, a weather target, and a parking target; and
    based on the computed vehicle state and the target anomaly, adjusting a suspension height of the vehicle.

2. The method of claim 1, further comprising:
    receiving real-time data about the current driving dynamic from one or more vehicle dynamic sensors, wherein the real-time data indicates deterioration of the vehicle's chassis and an uneven ride height of a vehicle-body.

3. The method of claim 2, wherein, when the anomaly mitigation suspension mode is selected based on a chassis deterioration anomaly, the suspension mode is configured to passively vary the ride height of the vehicle-body at wheels of the vehicle based on a detected level of deterioration.

4. The method of claim 3, wherein passively varying the ride height of the vehicle-body further includes application of an offset value to a desired ride height value, wherein the desired ride height value is configured to compensate for the detected level of deterioration to achieve a target ride height value.

5. The method of claim 1, wherein a suspension height request is signaled via actuators located at wheels of the vehicle.

6. The method of claim 1, further comprising:
    receiving, at a mode manager, signals indicating the vehicle is being parked and, when the anomaly mitigation suspension mode is selected based on a parking target anomaly, adjusting a suspension height of the vehicle includes adjusting a nose position of the vehicle to achieve an expanded field of view for an operator of the vehicle.

7. The method of claim 6, wherein achieving an expanded field of view includes obtaining a desired pitch angle target.

8. The method of claim 1, further comprising:
    receiving, at a mode manager, signals indicative of a drag factor associated with a current wind speed experienced by the vehicle and, when the anomaly mitigation suspension mode is selected based on a fuel economy target anomaly, adjusting a suspension height of the vehicle includes increasing or decreasing the suspension height of the vehicle, based on the received signals, to achieve a maximum fuel economy.

9. The method of claim 1, further comprising:
receiving, at a mode manager, signals corresponding to a static suspension height of the vehicle and, when the anomaly mitigation suspension mode is selected based on a passive static suspension height (PSSH) compensation target anomaly, adjusting a suspension height of the vehicle includes adjusting a nose position of the vehicle to achieve a desired compensation target value.

10. The method of claim 1, further comprising:
receiving, at a mode manager, signals corresponding to local traffic conditions and, when the anomaly mitigation suspension mode is selected based on a traffic target anomaly, adjusting a suspension height of the vehicle includes increasing the suspension height to achieve a maximum vehicle ride height and/or adjusting a pitch and/or roll angle of the suspension to improve an operator's field of view.

11. A system for assigning vehicle suspension dynamics, comprising:
a controller configured to:
generate control signals corresponding to a current driving dynamic of a vehicle suspension system;
compute a vehicle state associated with the generated control signals;
when the computed vehicle state is indicative of an anomaly in a predetermined vehicle target, select an anomaly mitigation suspension mode, wherein the anomaly mitigation suspension mode is configured to control the vehicle suspension to achieve a desired suspension height for each of a plurality of predetermined vehicle targets, wherein the predetermined vehicle targets include chassis deterioration, a fuel economy target, a passive static suspension height (PSSH) compensation target, a terrain target, a traffic target, a weather target, and a parking target; and
based on the computed vehicle state and the target anomaly, adjust a suspension height of the vehicle.

12. The system of claim 11, wherein the controller is further configured to:
receive real-time data about the current driving dynamic from one or more vehicle dynamic sensors, wherein the real-time data indicates deterioration of the vehicle's chassis and an uneven ride height of a vehicle-body.

13. The system of claim 12, wherein when the anomaly mitigation suspension mode is selected based on chassis deterioration anomaly, the controller is configured to passively vary the ride height of the vehicle-body at wheels of the vehicle based on a detected level of deterioration.

14. The system of claim 13, wherein, when passively varying the ride height of the vehicle-body, the controller is further configured to apply an offset value to a desired ride height value, wherein the desired ride height value is selected to compensate for the detected level of deterioration to achieve a target ride height value.

15. The system of claim 11, wherein the controller is further configured to:
receive a signaled suspension ride height request via actuators located at wheels of the vehicle.

16. The method of claim 1, further comprising:
receiving, at a mode manager, signals corresponding to current weather conditions and, when the anomaly mitigation suspension mode is selected based on a weather target anomaly, adjusting a suspension height of the vehicle includes adjusting a nose position of the vehicle to achieve a desired weather compensation target.

17. The method of claim 1, further comprising:
receiving, at a mode manager, signals corresponding to a detected terrain and, when the anomaly mitigation suspension mode is selected based on a terrain target anomaly, adjusting a suspension height of the vehicle includes increasing a ground clearance over the detected terrain.

18. The system of claim 11, wherein, when the anomaly mitigation suspension mode is selected based on a fuel economy target anomaly, the controller is further configured to:
receive, at a mode manager, signals indicative of a drag factor associated with a current wind speed experienced by the vehicle and, based on the received signals, increase or decrease the suspension height of the vehicle to achieve a maximum fuel economy.

19. The system of claim 11, wherein, when the anomaly mitigation suspension mode is selected based on a traffic target anomaly, the controller is further configured to:
receive, at a mode manager, signals corresponding to local traffic conditions and, based on the received signals, increase the suspension height to achieve a maximum vehicle ride height and/or adjust a pitch and/or roll angle of the suspension to improve an operator's field of view.

20. The system of claim 11, wherein, when the anomaly mitigation suspension mode is selected based on a weather target anomaly, the controller is further configured to:
receiving, at a mode manager, signals corresponding to current weather conditions and, based on the received signals, adjust a nose position of the vehicle to achieve a desired weather compensation target.

21. The system of claim 11, wherein, when the anomaly mitigation suspension mode is selected based on a parking target anomaly, the controller is further configured to:
receive, at a mode manager, signals indicating the vehicle is being parked and, based on the received signals, adjust a nose position of the vehicle to achieve an expanded field of view for an operator of the vehicle.

22. The system of claim 11, wherein, when the anomaly mitigation suspension mode is selected based on a terrain target anomaly, the controller is further configured to:
receive, at a mode manager, signals corresponding to a detected terrain and, based on the received signals, increase a ground clearance over the detected terrain.

23. The system of claim 11, wherein, when the anomaly mitigation suspension mode is selected based on a passive static suspension height (PSSH) compensation target anomaly, the controller is further configured to:
receive, at a mode manager, signals corresponding to a static suspension height of the vehicle and, based on the received signals, adjust a nose position of the vehicle to achieve a desired compensation target value.

* * * * *